(12) United States Patent
Bates

(10) Patent No.: US 9,413,559 B2
(45) Date of Patent: Aug. 9, 2016

(54) PREDICTIVE ANALYSIS OF NETWORK ANALYTICS

(75) Inventor: John Bates, Springville, UT (US)

(73) Assignee: Adobe Systems Incorporated, San Jose, CA (US)

( * ) Notice: Subject to any disclaimer, the term of this patent is extended or adjusted under 35 U.S.C. 154(b) by 848 days.

(21) Appl. No.: 13/223,065

(22) Filed: Aug. 31, 2011

(65) Prior Publication Data

US 2014/0304390 A1 Oct. 9, 2014

Related U.S. Application Data

(60) Provisional application No. 61/493,289, filed on Jun. 3, 2011.

(51) Int. Cl.
*G06F 11/30* (2006.01)
*H04L 12/64* (2006.01)
*H04L 12/24* (2006.01)

(52) U.S. Cl.
CPC .......... *H04L 12/6418* (2013.01); *H04L 41/147* (2013.01)

(58) Field of Classification Search
CPC ..... H04L 43/045; H04L 41/147; H04L 41/14; H04L 12/6418
USPC .................................. 709/224; 715/822, 736
See application file for complete search history.

(56) References Cited

U.S. PATENT DOCUMENTS

| | | | | |
|---|---|---|---|---|
| 7,734,775 | B2 * | 6/2010 | Barnett et al. | 709/224 |
| 8,352,310 | B1 * | 1/2013 | Bessler et al. | 705/7.38 |
| 8,527,620 | B2 * | 9/2013 | Olsson et al. | 709/224 |
| 8,583,472 | B2 * | 11/2013 | Iannucci et al. | 705/7.39 |
| 8,694,635 | B1 * | 4/2014 | Anand | G06Q 50/01 705/319 |
| 8,713,141 | B1 * | 4/2014 | Liu et al. | 709/223 |
| 9,083,562 | B2 * | 7/2015 | Bates | H04L 12/6418 |
| 2003/0191837 | A1 * | 10/2003 | Chen | 709/224 |
| 2008/0056144 | A1 * | 3/2008 | Hutchinson et al. | 370/250 |
| 2008/0235075 | A1 * | 9/2008 | Couture et al. | 705/10 |
| 2011/0270732 | A1 * | 11/2011 | Ritter et al. | 705/37 |
| 2014/0303953 | A1 * | 10/2014 | Bates | G06Q 30/02 703/13 |

* cited by examiner

*Primary Examiner* — Kenneth R Coulter
(74) *Attorney, Agent, or Firm* — Kilpatrick Townsend & Stockton LLP

(57) ABSTRACT

Methods and apparatus for ascertaining trends in network activity data are disclosed. A plurality of trend indicators is calculated for a plurality of values of a metric associated with network activity for a network content provider. The trend indicators include one or more moving averages of the plurality of values of the metric, and one or more standard deviation values of the plurality of values of the metric. A time-series graphical overlay representation of the plurality of values of the metric and the plurality of trend indicators demonstrating a relationship between the metric values and the trend indicators is displayed.

14 Claims, 15 Drawing Sheets

PREDICTIVE ANALYSIS OF NETWORK ANALYTICS

CLAIM FOR PRIORITY TO PROVISIONAL APPLICATION

This application claims benefit of priority of U.S. Provisional Application Ser. No. 61/493,289 entitled "Predictive Analysis of Network Analytics" filed Jun. 3, 2011, the content of which is incorporated by reference herein in its entirety.

BACKGROUND

Description of the Related Art

Goods and services providers often employ various forms of marketing to drive consumer demand for products and services. Marketing includes various techniques to expose to target audiences to brands, products, services, and so forth. For example, marketing often includes providing promotions (e.g., advertisements) to an audience to encourage them to purchase a product or service. In some instances, promotions are provided through media outlets, such as television, radio, and the internet via television commercials, radio commercials and webpage advertisements. In the context of websites, marketing may provide advertisements for a website and products associated therewith to encourage persons to visit the website, use the website, purchase products and services offered via the website, or otherwise interact with the website.

Marketing promotions often require a large financial investment. A business may fund an advertisement campaign with the expectation that increases in revenue attributable to marketing promotions exceed the associated cost. A marketing campaign may be considered effective if it creates enough interest and/or revenue to offset the associated cost. Accordingly, marketers often desire to track the effectiveness of their marketing techniques generally, as well as the effectiveness of specific promotions. For example, a marketer may desire to know how many customers purchased a product as a result of a particular placement of an ad in a website.

In the context of internet advertising, tracking user interaction with a website is known as "web analytics." Web analytics is the measurement, collection, analysis and reporting of internet data for purposes of understanding and optimizing web usage. Web analytics provides information about the number of visitors to a website and the number of page views, as well as providing information about the behavior of users while they are viewing the site.

SUMMARY

Methods and apparatus for ascertaining trends in network activity data are disclosed. A plurality of trend indicators is calculated for a plurality of values of a metric associated with network activity for a network content provider. The trend indicators include one or more moving averages of the plurality of values of the metric, and one or more standard deviation values of the plurality of values of the metric. A time-series graphical overlay representation of the plurality of values of the metric and the plurality of trend indicators demonstrating a relationship between the metric values and the trend indicators is displayed.

Figure 1:
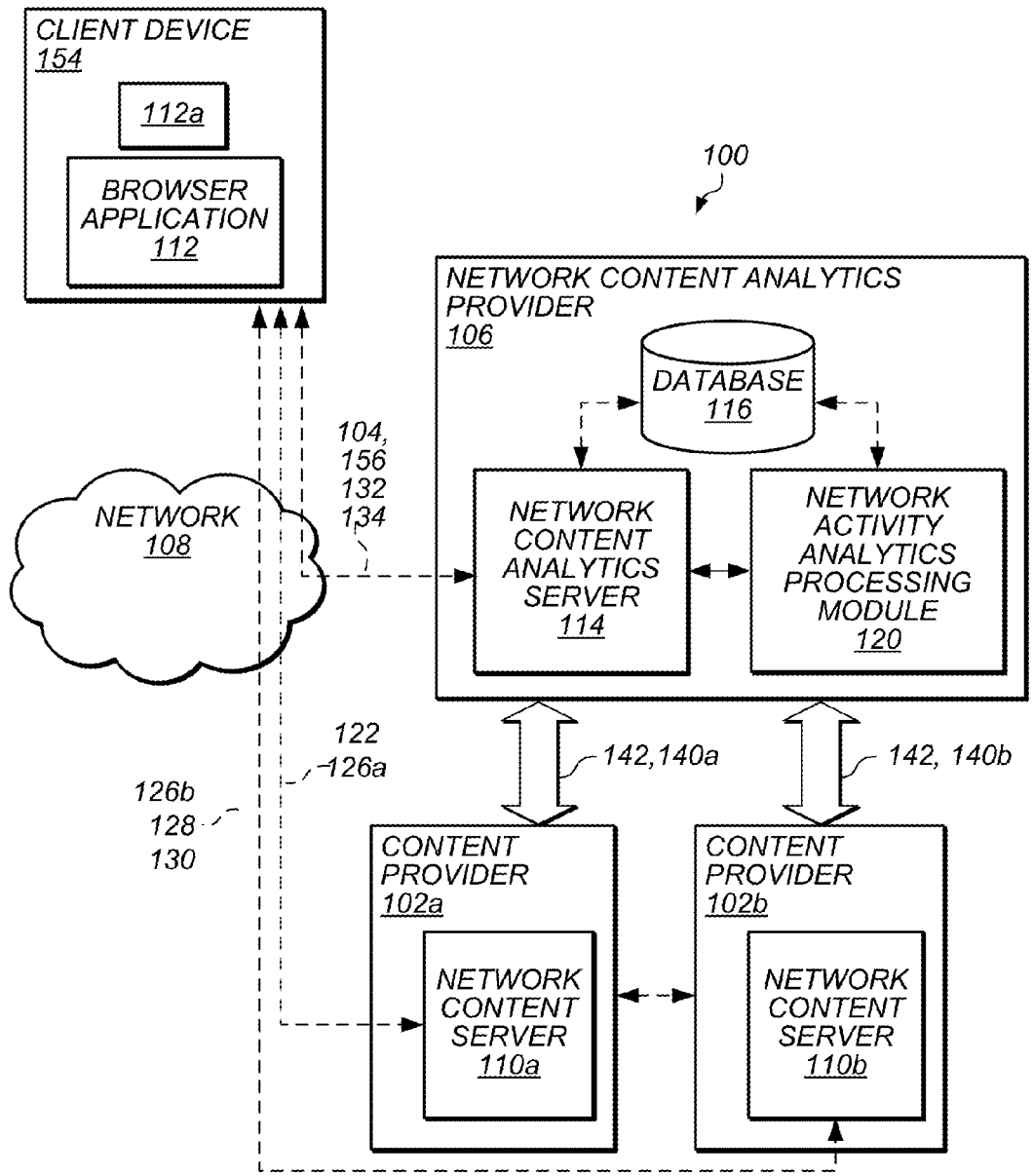
FIG. 1 illustrates an example network content analytics system configured to support predictive analysis of network content analytics in accordance with one or more other embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Predictive Analytics for Network Activity

Various embodiments of methods and apparatus for predictive analysis of network activity include support for predicting future network activity. Some embodiments graphically display, in response to a requested value of an independent variable describing a suspected determinant of network activity for a network content provider, a set of predicted values of a dependent variable. In some embodiments, the set of predicted values of the dependent variable is predicted based on a relationship between the independent variable and the dependent variable. The dependent variable reflects an aspect of the network activity for the network content provider. The relationship is derived from a plurality of metric values, and the plurality of metric values comprises metric values describing the network activity for the network content provider. Some embodiments allow for setting a plurality of independent variables to the requested value of the independent variable and displaying a plurality of values of the dependent variable based on a plurality of respective relationships between the plurality of independent variables and the dependent variable. The plurality of relationships is derived from the plurality of metric values.

Some embodiments support ascertaining trends in network activity data. Some embodiments calculate a plurality of trend indicators for a plurality of values of a metric associated with network activity for a network content provider. In some embodiments, the trend indicators comprise one or more moving averages of the plurality of values of the metric, and one or more standard deviation values of the plurality of values of the metric. Some embodiments display a time-series graphical overlay representation of the plurality of values of the metric and the plurality of trend indicators demonstrating a relationship between the metric values and the trend indicators.

Some embodiments may include a means for accessing or loading data indicative of network activity for analysis. For example, a network activity analytics processing module may receive input describing the network activity for the network content provider, and may calculate metrics and trend identifiers, provide graphical displays describing various aspects of the network activity for the network content provider, and predict future network activity as described herein. The network activity analytics processing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input describing the network activity for the network content provider, calculating metrics and trend identifiers, providing graphical displays describing various aspects of the network activity for the network content provider, and predicting future network activity, as described herein. Other embodiments of the network activity analytics processing module may be at least partially implemented by hardware circuitry and/or firmware stored, for example, in a non-volatile memory.

Systems for Predictive Analytics of Network Activity

FIG. 1 illustrates an example network content analytics system configured to support predictive analysis of network content analytics in accordance with one or more other embodiments. A network content analytics system 100 in accordance with one or more embodiments may be employed to accumulate and/or process analytics data 104 representing various aspects of network activity used to assess an effectiveness of one or more items of network content. In the illustrated embodiment, system 100 includes content providers 102*a* and 102*b* hosting network content servers 110*a* and 110*b*, respectively, a client device 154 and a network content analytics provider 106.

Each of content providers 102*a* and 102*b*, client device 154 and network content analytics provider 106 may be communicatively coupled to one another via a network 108. Network 108 may include any channel for providing effective communication between each of the entities of system 100. In some embodiments, network 108 includes an electronic communication network, such as the internet, a local area network (LAN), a cellular communications network, or the like. Network 108 may include a single network or combination of networks that facilitate communication between each of the entities (e.g., content providers 102*a* and 102*b*, client device 154 and network content analytics provider 106) of system 100.

Client device 154 may retrieve content from content providers 102*a* and/or 102*b* via network 108. Client device 154 may transmit corresponding analytics data 104 to network content analytics provider 106 via network 108. Network content analytics provider 106 may employ a network activity analytics processing module 120 to assess analytics data 104 and to perform receiving input describing the network activity for the network content provider, calculating metrics and trend identifiers, providing graphical displays describing various aspects of the network activity for the network content provider, and predicting future network activity, as described herein.

For example, network activity analytics processing module 120 may be used to calculate a plurality of trend indicators for a plurality of values of a metric associated with network activity for a content provider 102 and display a time-series graphical overlay representation of the plurality of values of the metric and the plurality of trend indicators demonstrating a relationship between the metric values and the trend indicators. As a further example, network activity analytics processing module 120 may be used to graphically display, in response to a requested value of an independent variable describing a suspected determinant of network activity for a content provider 102, a set of predicted values of a dependent variable. As a further example, network activity analytics processing module 120 may be used to set a plurality of independent variables to the requested value of the independent variable and display a plurality of values of the dependent variable based on a plurality of respective relationships between the plurality of independent variables and the dependent variable. In some embodiments, network activity analytics processing module 120 may calculate, provide and display rankings of various relationships between independent and dependent variables of network activity with respect to content providers 102 and may indicate the significance of particular independent variables in influencing a dependent variable of network activity with respect to content providers 102. Additionally, network activity analytics processing module 120 may predict and display the probability of a particular value of an independent variable of network activity with respect to content providers 102. While network activity analytics processing module 120 is shown in FIG. 1 as a component of network content analytics provider 106, one of skill in the art will readily realize in light of having read the present disclosure that network activity analytics processing module 120 may be embodied in a separate system with access to a database 116 through network content analytics server 114 via network 108.

Content providers 102*a* and/or 102*b* may include source of information/content (e.g., an HTML file defining display information for a webpage) that is provided to client device 154. For example content providers 102*a* and/or 102*b* may include vendor websites used to present retail merchandise to a consumer. In some embodiments, content providers 102*a* and 102*b* may include respective network content servers 110*a* and 110*b*. Network content servers 110*a* and 110*b* may include web content 126*a* and 126*b* stored thereon, such as HTML files that are accessed and loaded by client device 154 for viewing webpages of content providers 102*a* and 102*b*. In some embodiments, content providers 102*a* and 102*b* may serve client device 154 directly. For example, content 126 may be provided from each of servers 110*a* or 110*b* directly to client device 154. In some embodiments, one of content providers 102*a* and 102*b* may act as a proxy for the other of content providers 102*a* and 102*b*. For example, server 110*a* may relay content from server 110*b* to client device 154.

Client device 154 may include a computer or similar device used to interact with content providers 102*a* and 102*b*. In some embodiments, client device 154 includes a wireless device used to access content 126*a* (e.g., web pages of a websites) from content providers 102*a* and 102*b* via network 108. For example, client device 154 may include a personal computer, a cellular phone, a personal digital assistant (PDA), or the like.

In some embodiments, client device 154 may include an application (e.g., internet web-browser application) 112 that can be used to generate a request for content, to render content, and/or to communicate request to various devices on the network. For example, upon selection of a website link on a webpage displayed to the user by browser application 112, browser application 112 may submit a request for the corresponding webpage/content to web content server 110*a*, and web content server 110*a* may provide corresponding content 126*a*, including an HTML file, that is executed by browser application 112 to render the requested website for display to the user. In some instances, execution of the HTML file may cause browser application 112 to generate additional request for additional content (e.g., an image referenced in the HTML file as discussed below) from a remote location, such as content providers 102*a* and 102*b* and/or network content analytics provider 106. The resulting webpage 112*a* may be viewed by a user via a video monitor or similar graphical presentation device of client device 154. While webpage 112*a* is discussed as an example of the network content available for use with the embodiments described herein, one of skill in the art will readily realize that other forms of content, such as audio or moving image video files, may be used without departing from the scope and content herein disclosed. Likewise, while references herein to HTML and the HTTP protocol are discussed as an example of the languages and protocols available for use with the embodiments described herein, one of skill in the art will readily realize that other forms of languages and protocols, such as XML or FTP may be used without departing from the scope and content herein disclosed.

Network analytics provider 106 may include a system for the collection and processing of analytics data 104, and the generation of corresponding metrics (e.g., hits, page views, visits, sessions, downloads, first visits, first sessions, visitors, unique visitors, unique users, repeat visitors, new visitors, impressions, singletons, bounce rates, exit percentages, visibility time, session duration, page view duration, time on page, active time, engagement time, page depth, page views per session, frequency, session per unique, click path, click, site overlay) web analytics reports including various metrics of the web analytics data (e.g., a promotion effectiveness index and/or a promotion effectiveness ranking) Analytics data 104 may include data that describes usage and visitation patterns for websites and/or individual webpages within the website. Analytics data 104 may include information relating to the activity and interactions of one or more users with a given website or webpage. For example, analytics data 104 may include historic and/or current website browsing information for one or more website visitors, including, but not limited to identification of links selected, identification of web pages viewed, identification of conversions (e.g., desired actions taken—such as the purchase of an item), number of purchases, value of purchases, and other data that may help gauge user interactions with webpages/websites.

In some embodiments, analytics data 104 includes information indicative of a location. For example analytics data may include location data 108 indicative of a geographic location of client device 154. In some embodiments, location data 108 may be correlated with corresponding user activity. For example, a set of received analytics data 104 may include information regarding a user's interaction with a web page (e.g., activity data) and corresponding location data indicative of a location of client device 154 at the time of the activity. Thus, in some embodiments, analytics data 104 can be used to assess a user's activity and the corresponding location of the user during the activities. In some embodiments, location data includes geographic location information. For example, location data may include an indication of the geographic coordinates (e.g., latitude and longitude coordinates), IP address or the like or a user or a device.

In some embodiments, analytics data 104 is accumulated over time to generate a set of analytics data (e.g., an analytics dataset) that is representative of activity and interactions of one or more users with a given website or webpage. For example, an analytics dataset may include analytics data associated with all user visits to a given website. Analytics data may be processed to generate metric values that are indicative of a particular trait or characteristic of the data (e.g., a number of website visits, a number of items purchased, value of items purchased, a conversion rate, a promotion effectiveness index, etc.).

Network content analytics provider 106 may include a third-party website traffic statistic service. Network content analytics provider 106 may include an entity that is physically separate from content providers 102a and 102b. Network content analytics provider 106 may reside on a different network location from content providers 102a and 102b and/or client device 154. In the illustrated embodiment, for example, network content analytics provider 106 is communicatively coupled to client device 154 via network 108. Network content analytics provider 106 may be communicatively coupled to content providers 102a and 102b via network 108. Network content analytics provider 106 may receive analytics data 104 from client device 154 via network 108 and may provide corresponding analytics data (e.g., web analytics reports) to content provider 102a and 102b or to network activity analytics module 220 via network 108 or some other form of communication.

In the illustrated embodiment, network activity analytics provider 106 includes a network content analytics server 114, a network content analytics database 116, and a network content analytics processing module 120. In some embodiments, network activity analytics processing module 120 may include computer executable code (e.g., executable software modules) stored on a computer readable storage medium that is executable by a computer to provide associated processing. For example, network activity analytics processing module 120 may process web analytics datasets stored in database 116 to generate corresponding web analytics reports that are provided to content providers 102a and 102b. Accordingly, network activity analytics processing module 120 may assess analytics data 104 to assess an effectiveness of one or more promotions and perform the trend ascertainment and predictive functions described herein.

Network content analytics server 114 may service requests from one or more clients. For example, upon loading/rendering of a webpage 112a by browser 112 of client device 154, browser 112 may generate a request to network content analytics server 114 via network 108. Network content analytics server 114 may process the request and return appropriate content (e.g., an image) 156 to browser 112 of client device 154. In some embodiments, the request includes a request for an image, and network content analytics provider 106 simply returns a single transparent pixel for display by browser 112 of client device 154, thereby fulfilling the request. The request itself may also include web analytics data embedded therein. Some embodiments may include content provider 102a and/or 102b embedding or otherwise providing a pointer to a resource, known as a "web bug", within the HTML code of the webpage 112a provided to client device 154. The resource may be invisible a user, such as a transparent one-pixel image for display in a web page. The pointer may direct browser 112 of client device 154 to request the resource from network content analytics server 114. Network content analytics server 114 may record the request and any additional information associated with the request (e.g., the date and time, and/or identifying information that may be encoded in the resource request).

In some embodiments, an image request embedded in the HTML code of the webpage may include codes/strings that are indicative of web analytics data, such as data about a user/client, the user's computer, the content of the webpage, or any other web analytics data that is accessible and of interest. A request for an image may include, for example, "image.gif/XXX . . . " wherein the string "XXX . . . " is indicative of the analytics data 104. For example, the string "XXX" may include information regarding user interaction with a website (e.g., activity data).

Network content analytics provider 106 may parse the request (e.g., at network content analytics server 114 or network activity analytics processing module 120) to extract the web analytics data contained within the request. Analytics data 104 may be stored in database 116, or a similar storage/memory device, in association with other accumulated web analytics data. In some embodiments, network activity analytics processing module 120 may receive/retrieve analytics data from network content analytics server 114 and/or database 116. Network activity analytics processing module 120 may process the analytics data to generate one or more web analytics reports, including graphical displays and trend and prediction analysis, as described herein. For example, network content analytics server 114 may filter the raw web analytics data received at network content analytics server 114 to be used by network activity analytics processing module 120 in generating trends and predictions analytics reports, as may be requested by a website administrator of one of content providers 102a and 102b. Reports, for example, may include overviews and statistical analyses describing the relative frequency with which various site paths are being followed through the content provider's website, the rate of converting a website visit to a purchase (e.g., conversion), an effectiveness of various promotions, and so forth, and identifying trends in and making predictions from the data as requested.

In some embodiments, client device 154 executes a software application, such as browser application 112, for accessing and displaying one or more webpages 112a. In response to a user command, such as clicking on a link or typing in a uniform resource locator (URL), browser application 112 may issue a webpage request 122 to web content server 110a of content provider 102a via network 108 (e.g., via the Internet). In response to request 122, web content server 110a may transmit the corresponding content 126a (e.g., webpage HTML code corresponding to webpage 112a) to browser application 112. Browser application 112 may interpret the received webpage code to display the requested webpage 112a at a user interface (e.g., monitor) of client 154. Browser application 112 may generate additional requests for content from the servers, or other remote network locations, as needed. For example, if webpage code calls for content, such as an advertisement, to be provided by content provider 102b, browser application 112 may issue an additional request 130 to web content server 110b. Web content server 110b may provide a corresponding response 128 containing requested content, thereby fulfilling the request. Browser application 112 may assemble the additional content for display within webpage 112a.

In some embodiments, client device 154 also transmits webpage visitation tracking information to web analytics provider 106. For example, as described above, webpage code may include executable code (e.g., a web bug) to initiate a request for data from network content analytics server 114 such that execution of webpage code at browser 112 causes browser 112 to generate a corresponding request (e.g., a web-beacon request) 132 for the data to web analytics server 114. In some embodiments, request 132 may itself have analytics data (e.g., analytics data 104) contained/embedded therein, or otherwise associated therewith, such that transmitting request 132 causes transmission of analytics data from client 154 to web analytics provider 106. For example, as described above, request 132 may include an image request having an embedded string of data therein. Network content analytics provider 106 may process (e.g., parse) request 132 to extract analytics data 104 contained in, or associated with, request 132.

In some embodiments, request 132 from client 154 may be forwarded from network content analytics server 114 to database 116 for storage and/or to network activity analytics processing module 120 for processing. Network activity analytics processing module 120 and/or network content analytics server 114 may process the received request to extract web analytics data 104 from request 132. Where request 132 includes a request for an image, network content analytics server 114 may simply return content/image 134 (e.g., a single transparent pixel) to browser 112, thereby fulfilling request 128. In some embodiments, network content analytics provider 106 may transmit analytics data (e.g., analytics data 104) and/or a corresponding analytics reports to content providers 102a and/or 102b, or other interested entities.

For example, analytics data and/or web analytics reports 140a and 140b (e.g., including processed web analytics data) may be forwarded to site administrators of content providers 102a and 102b via network 108, or other forms of communication. In some embodiments, a content provider may log-in to a website, or other network based application, hosted by network content analytics provider 106, and may interact with network activity analytics processing module 120 to generate custom web analytics reports. For example, content provider 102a may log into a web analytics website via website server 114, and may interactively submit request 142a to generate reports from network activity analytics processing module 120 for various metrics (e.g., number of conversions for male users that visit the home page of the content provider's website, an effectiveness of a promotion, etc.), and network analytics provider 106 may return corresponding reports (e.g., reports dynamically generated via corresponding queries for data stored in database 116 and processing of the network activity analytics processing module 120). In some embodiments, content providers 102a and 102b may provide analytics data to web analytics provider 106.

In some embodiments, reports may include one or more metric values that are indicative of a characteristic/trait of a set of data or may include trends and prediction reporting and graphical displays as described herein.

Figure 2:
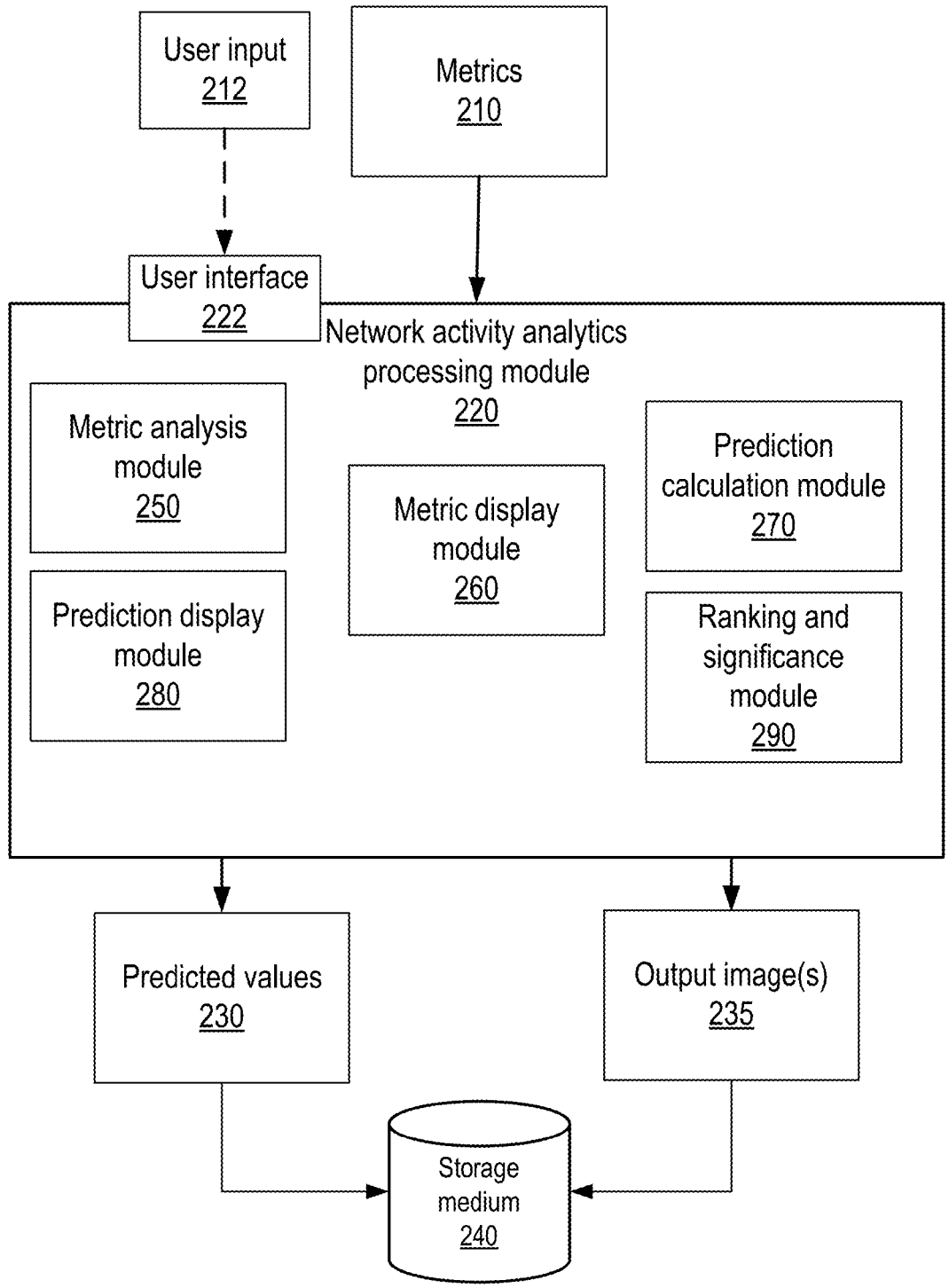
FIG. 2 depicts a module that may implement predictive analysis of network analytics, according to some embodiments.

FIG. 2 depicts a module that may implement predictive analysis of network analytics, according to some embodiments. Network activity analytics processing module 220 may, for example, implement one or more of a metric trends analysis tool, a linear regression prediction tool, and a variable relationship analysis tool, for performing the functions described herein with respect to FIGS. 5-9. FIG. 10 illustrates an example computer system on which embodiments of network activity analytics processing module 220 may be implemented. Network activity analytics processing module 220 receives as input one or more values of metrics 210, as discussed above. Network activity analytics processing module 220 may receive user input 112 activating a metric trends analysis tool, a linear regression prediction tool, and a variable relationship analysis tool, for performing the functions described herein with respect to FIGS. 5-9. Network activity analytics processing module 220 then performs the functions described herein with respect to FIGS. 5-9 on the metrics 210, according to user input 112 received via user interface 122. The user may activate a tool and further generate analysis of trends, analysis of relationships, or analysis of predictions. Network activity analytics processing module 220 generates as output one or more output images 235 for graphically displaying results, as well as one or more sets of predicted values 230. Output images 235 and predicted values 230 may, for example, be stored to a storage medium 240, such as system memory, a disk drive, DVD, CD, etc.

In some embodiments, network activity analytics processing module 220 may provide a user interface 222 via which a user may interact with the module 220, for example to activate a activate a trends analysis tool, configure displays, set independent variable values, and control relationships analyzed. In some embodiments, user interface 222 may provide user interface elements, such as dropdown boxes, whereby the user may select options including, but not limited to, variable values, relationships displayed, and granularity of calculations. An example of such a user interface is discussed below with respect to FIGS. 3-4F.

A metric analysis module 250 is used for calculating a plurality of trend indicators for a plurality of values of a metric associated with network activity for a network content provider, such as one or more moving averages of the plurality of values of the metric, and one or more standard deviation values of the plurality of values of the metric. A metric display module 260 is used for displaying a time-series graphical overlay representation of the plurality of values of the metric and the plurality of trend indicators demonstrating a relationship between the metric values and the trend indicators.

A prediction calculation module 270 is used for generating a set of predicted values of a dependent variable. The set of predicted values of the dependent variable is calculated based on a relationship between the independent variable and the dependent variable. The dependent variable reflects an aspect of the network activity for the network content provider. In some embodiments prediction calculation module 270 is used for deriving the relationship, where the relationship is derived from a plurality of metric values, and the plurality of metric values comprises metric values describing the network activity for the network content provider.

A prediction display module 280 is used for displaying a plurality of values of the dependent variable based on a plurality of respective relationships between the plurality of independent variables and the dependent variable. A ranking and significance module 290 is used for ranking the plurality of values of the dependent variable based on a measure of responsiveness of respective ones of the plurality of values of the dependent variable to change in the respective ones of the plurality of independent variables. In some embodiments, ranking and significance module 290 is used for identifying influence of ones of the ones of the plurality of independent variables over the dependent variable using multivariate regression analysis with respect to the plurality of metric values

User Interface for Predictive Analytics of Network Activity

Figure 3:
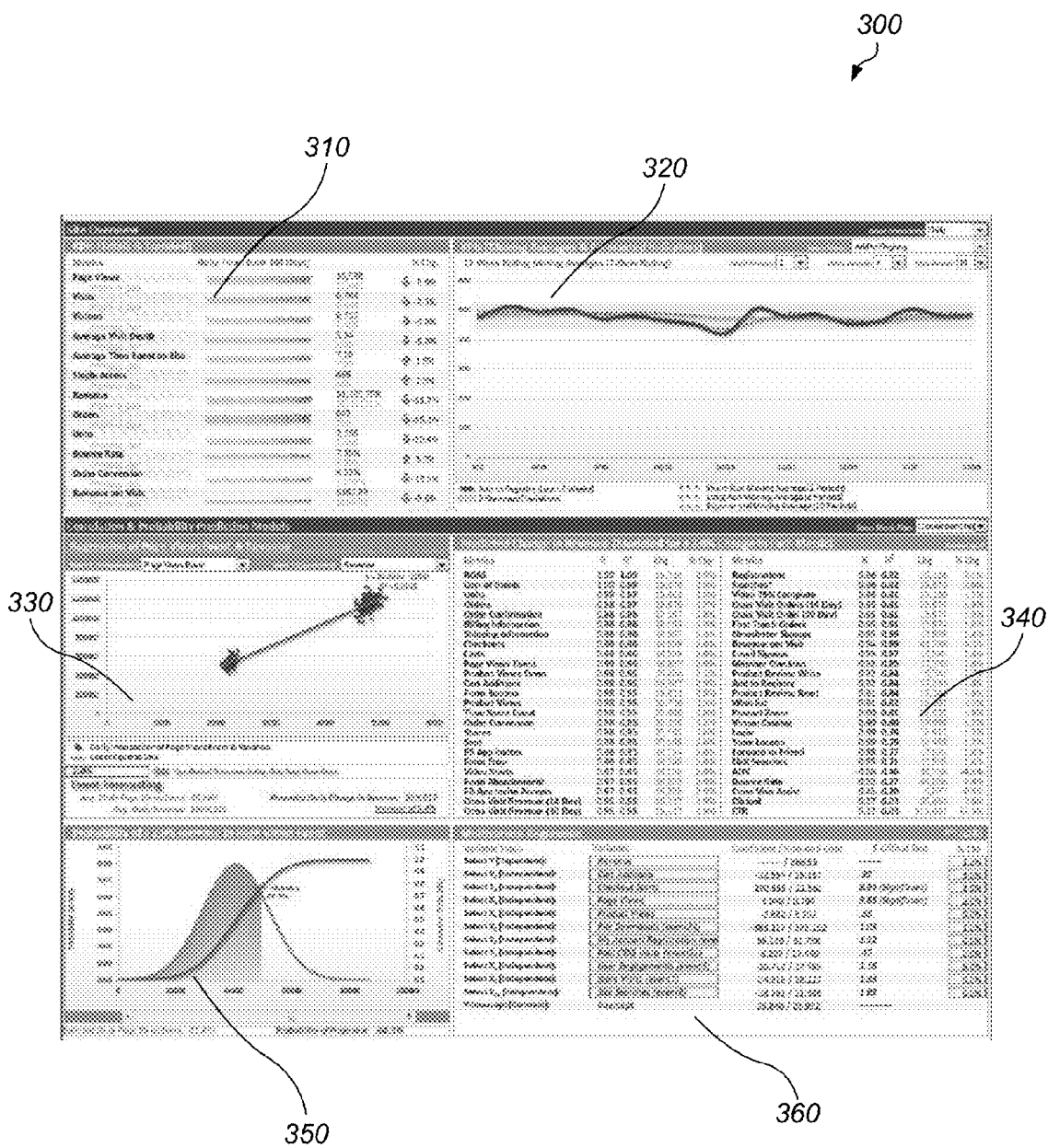
FIG. 3 illustrates a user interface that may be used in conjunction with predictive analysis of network analytics, according to some embodiments.

FIG. 3 illustrates a user interface that may be used in conjunction with predictive analysis of network analytics, according to some embodiments. User interface 300 includes various windows 310-360 for receiving input and displaying results, as described below.

A metrics display window 310 is used for is used displaying values of metrics of depicting various aspects of network activity, as described below with respect to FIG. 4A. A moving averages display window 320 is used for displaying a time-series graphical overlay representation of the plurality of values of the metric and the plurality of trend indicators demonstrating a relationship between the metric values and the trend indicators, as described below with respect to FIG. 4B.

A graphical prediction display window 330 is used for graphically displaying, in response to a requested value of an independent variable describing a suspected determinant of network activity for a network content provider, a set of predicted values of a dependent variable, as described below with respect to FIG. 4C.

A correlative ranking display window 340 is used for displaying the plurality of values of the dependent variable based on a ranking of the plurality of values of the dependent variable using a measure of responsiveness of respective ones of the plurality of values of the dependent variable to change in the respective ones of the plurality of independent variables, as described below with respect to FIG. 4D.

A prediction probability display window 350 is used for displaying a prediction a probability of the requested value of the independent variable, as described below with respect to FIG. 4E.

A significance display window 360 is used for displaying influence of ones of the ones of the plurality of independent variables over the dependent variable using multivariate regression analysis with respect to the plurality of metric values, as described below with respect to FIG. 4F.

Figure 4A:
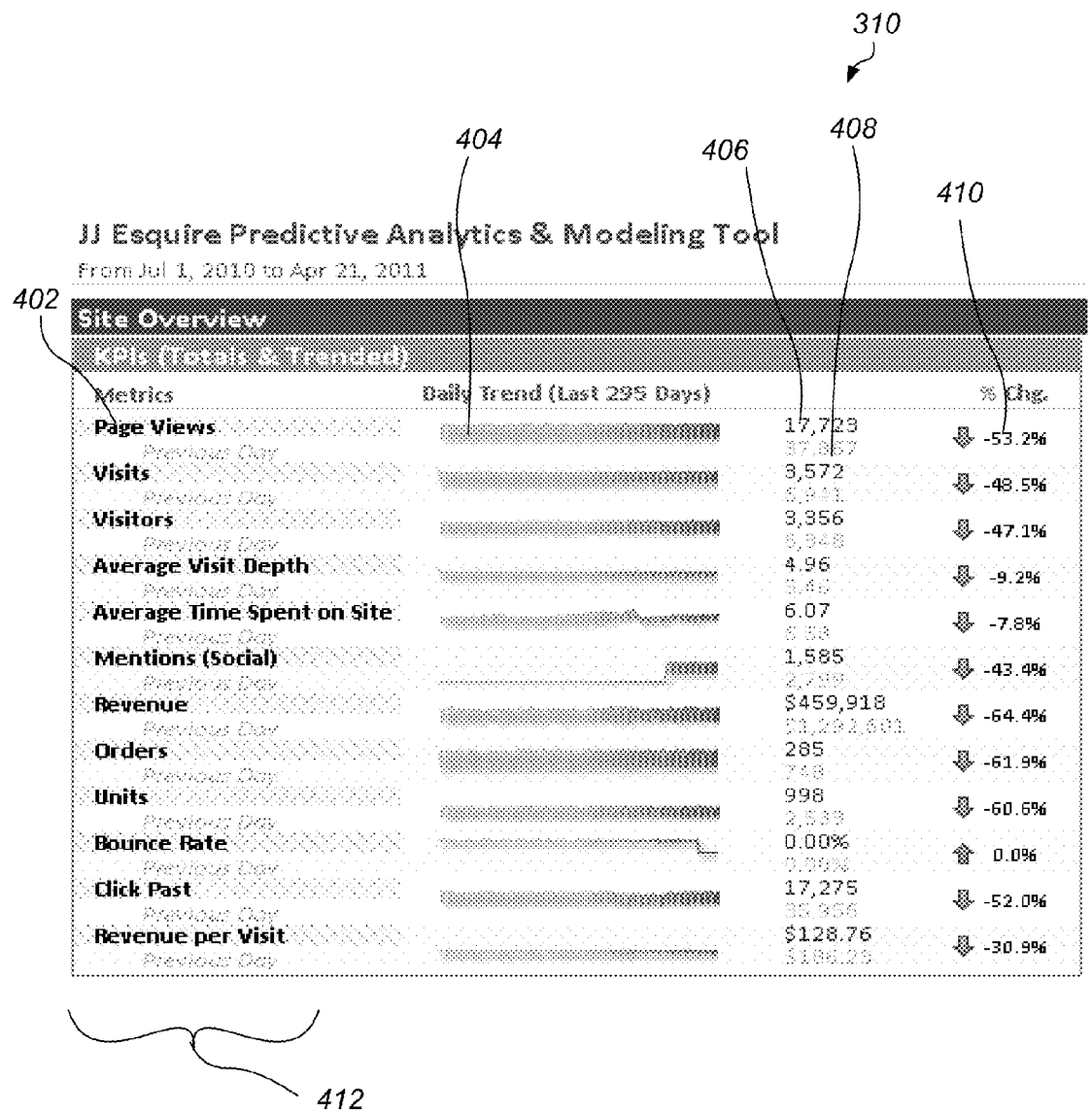
FIG. 4A depicts metrics display window of a user interface that may be used in conjunction with predictive analysis of network analytics, according to some embodiments.

FIG. 4A depicts metrics display window of a user interface that may be used in conjunction with predictive analysis of network analytics, according to some embodiments. A metrics display window 310 is used for displaying values of metrics of depicting various aspects of network activity. Metrics display window provides a very high level of key performance indicators, which are key metrics that can be interchanged and followed over time. For each metric 402 of a set of selected metrics 412, a graphical representation of a trend at a desired granularity (e.g., daily) 404 is provided. A value for the most recent granular unit (e.g., day) 406 is provided. A value for the immediate previous granular unit (e.g., day) 408 is provided and a percent change 410 is provided between the immediate previous granular unit 408 and the most recent granular unit 406.

Figure 4B:
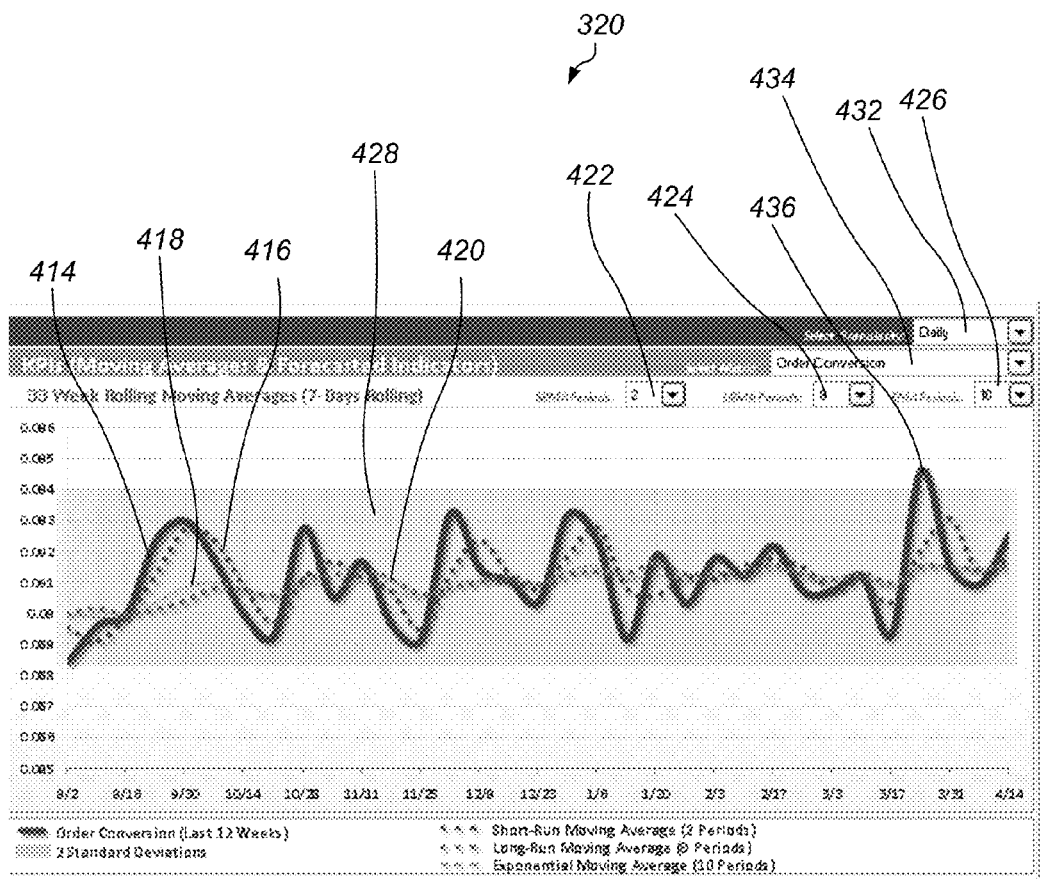
FIG. 4B illustrates a moving averages display window of a user interface that may be used in conjunction with predictive analysis of network analytics, according to some embodiments.

FIG. 4B illustrates a moving averages display window of a user interface that may be used in conjunction with predictive analysis of network analytics, according to some embodiments. A moving averages display window 320 is used for displaying a time-series graphical overlay representation of the plurality of values of the metric and the plurality of trend indicators demonstrating a relationship between the metric values and the trend indicators.

Moving averages display window 320 is used to give an idea of where a particular metric, indicated in a metric control 426 is moving, using metric values 414, a short-run moving average 416, a long-run moving average 420, an exponential moving average 418, and a standard deviation zone 430. Controls, such as a short run moving average periods control 422, a long run moving averages periods control 424 and an exponential moving averages control 426 control granularity of short-run moving average 416, long-run moving average 420, and exponential moving average 418, respectively. A metric selection control 434 determines the metric for which short-run moving average 416, long-run moving average 420, and exponential moving average 418 are calculated. In some embodiments, Bollinger bands are substituted for standard deviation zone 428.

Moving averages display window 320 is used for highlighting a statistically significant change in the metric, such as the departure 436 of metric values 414 from standard deviation zone 428. Other highlighting events can include a crossing of short-run moving average 416 and long-run moving average 420.

A granularity selection control 434 controls both the granularity of metric values 414 in moving averages display window 320 and a granularity used in metrics display window 310 of FIG. 4A.

Figure 4C:
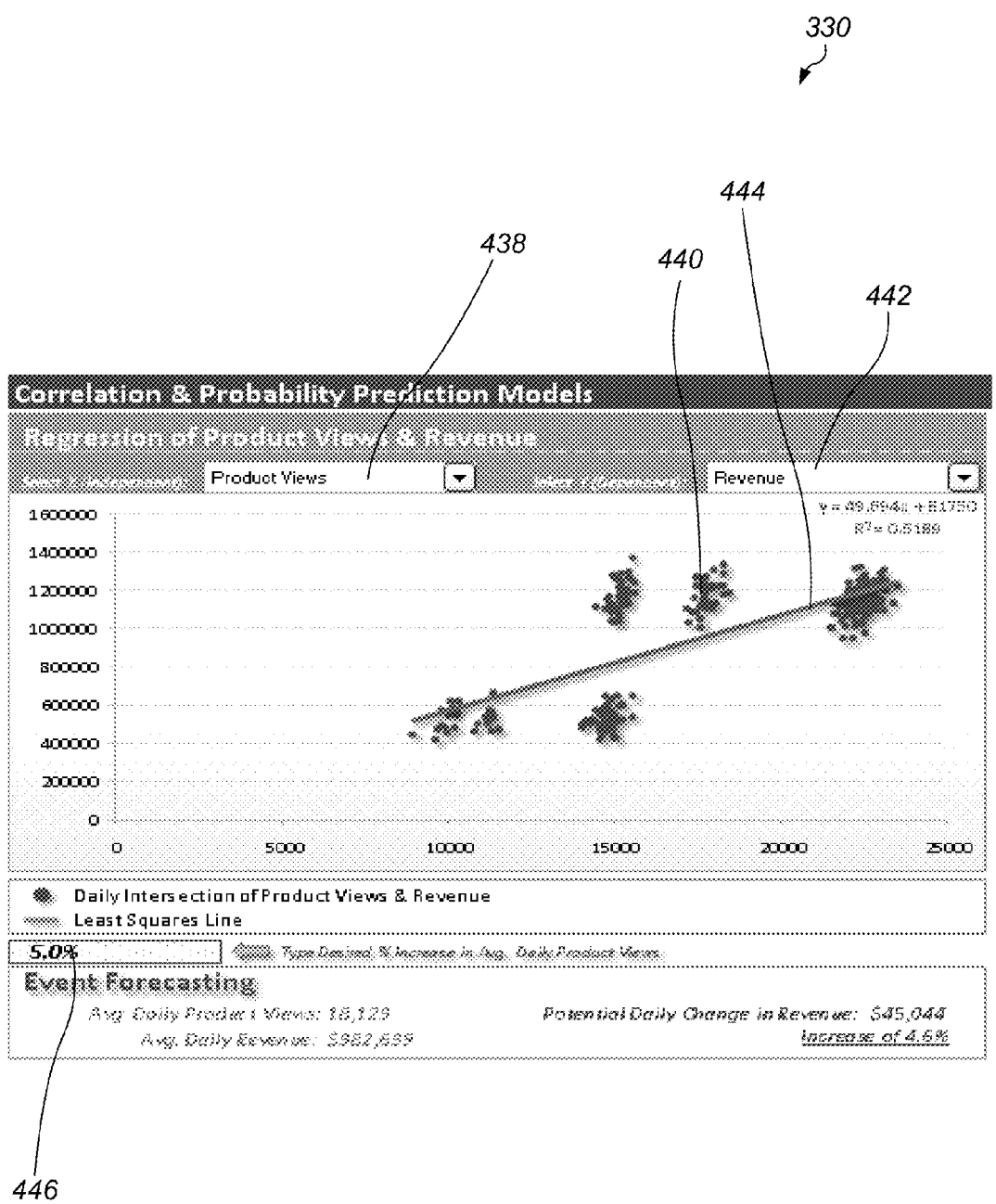
FIG. 4C depicts graphical prediction display window of a user interface that may be used in conjunction with predictive analysis of network analytics, according to some embodiments.

FIG. 4C depicts graphical prediction display window of a user interface that may be used in conjunction with predictive analysis of network analytics, according to some embodiments. A graphical prediction display window 330 is used for graphically displaying, in response to a requested value 446 of an independent variable 438 describing a suspected determinant of network activity for a network content provider, a set of predicted values 440 of a dependent variable 442 and a trend line 444.

Figure 4D:
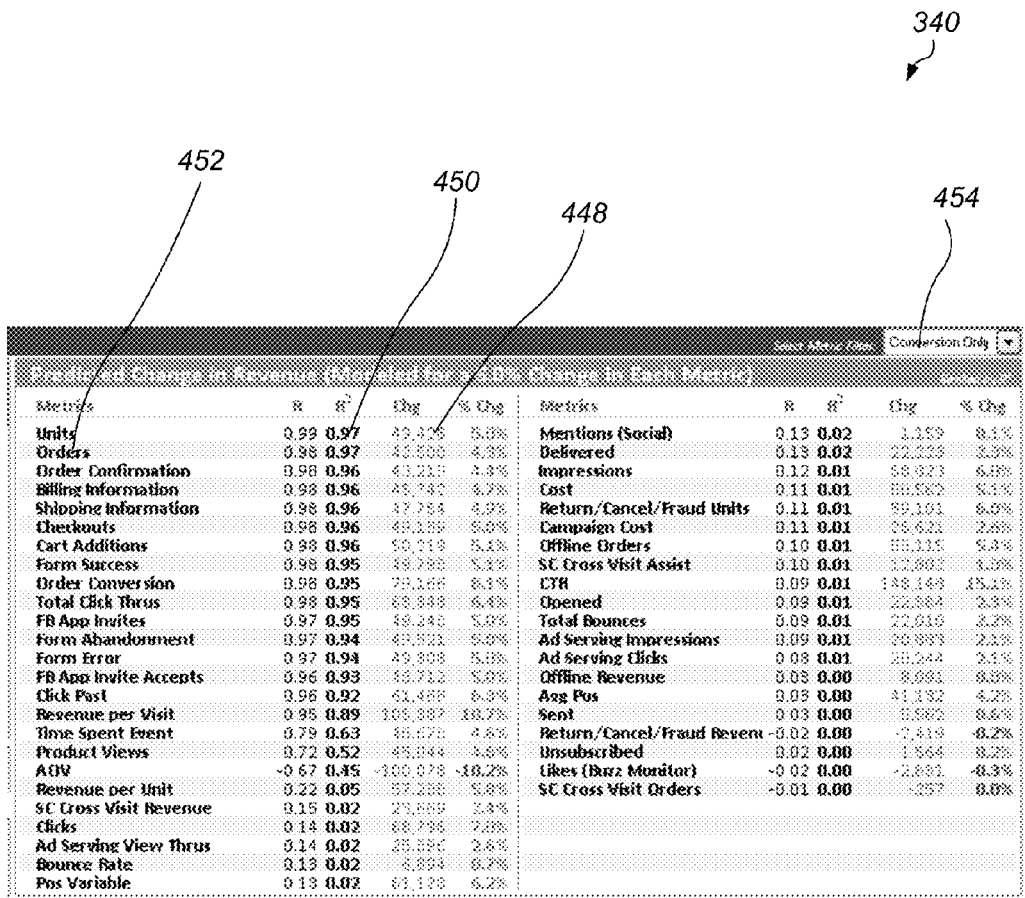
FIG. 4D illustrates a correlative ranking prediction display window of a user interface that may be used in conjunction with predictive analysis of network analytics, according to some embodiments.

FIG. 4D illustrates a correlative ranking prediction display window of a user interface that may be used in conjunction with predictive analysis of network analytics, according to some embodiments. A correlative ranking display window 340 is used for displaying the plurality of values of the dependent variable 448 based on a ranking 452 of the plurality of values of the dependent variable using a measure of responsiveness 450 of respective ones of the plurality of values of the dependent variable to change in the respective ones of the plurality of independent variables. A metric filter control 454 is provided. In the example shown in FIG. 4D, each dependent variable 452 is modeled 95% confidence.

Figure 4E:
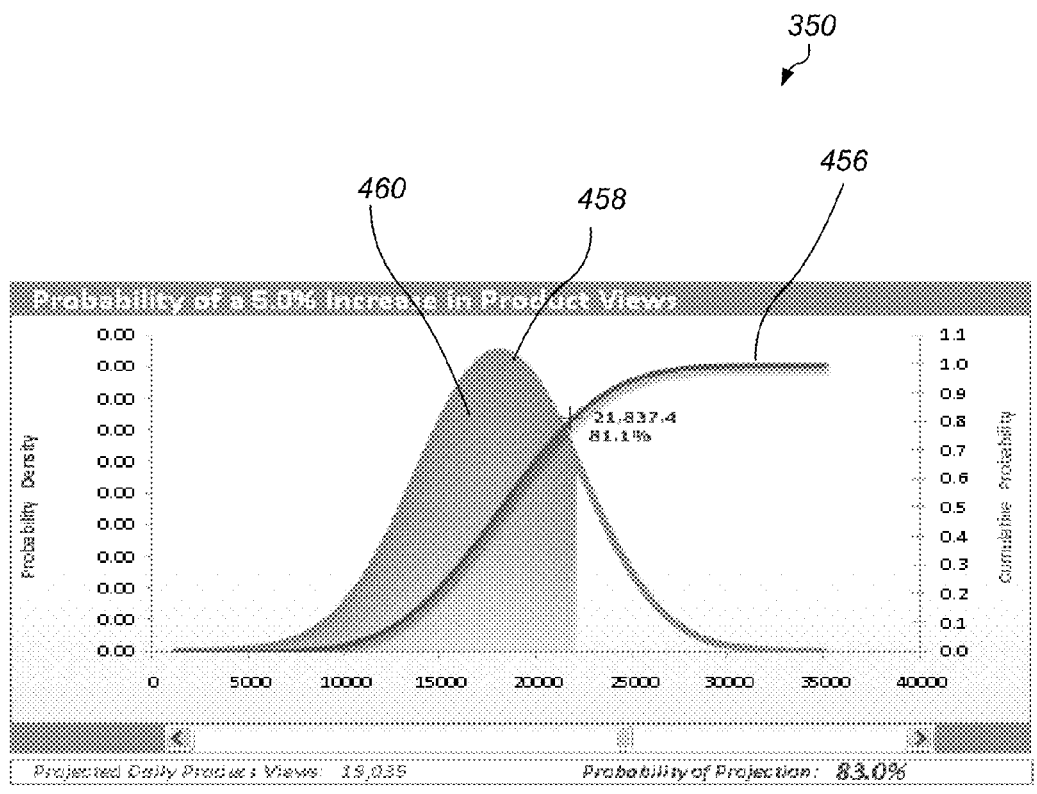
FIG. 4E depicts a prediction probability display window of a user interface that may be used in conjunction with predictive analysis of network analytics, according to some embodiments.

FIG. 4E depicts a prediction probability display window of a user interface that may be used in conjunction with predictive analysis of network analytics, according to some embodiments. A prediction probability display window 350 is used for displaying a total prediction probability 456 of the requested value of the independent variable and is displayed with a normalized metric 458 and a cumulative probability integration 460.

Figure 4F:
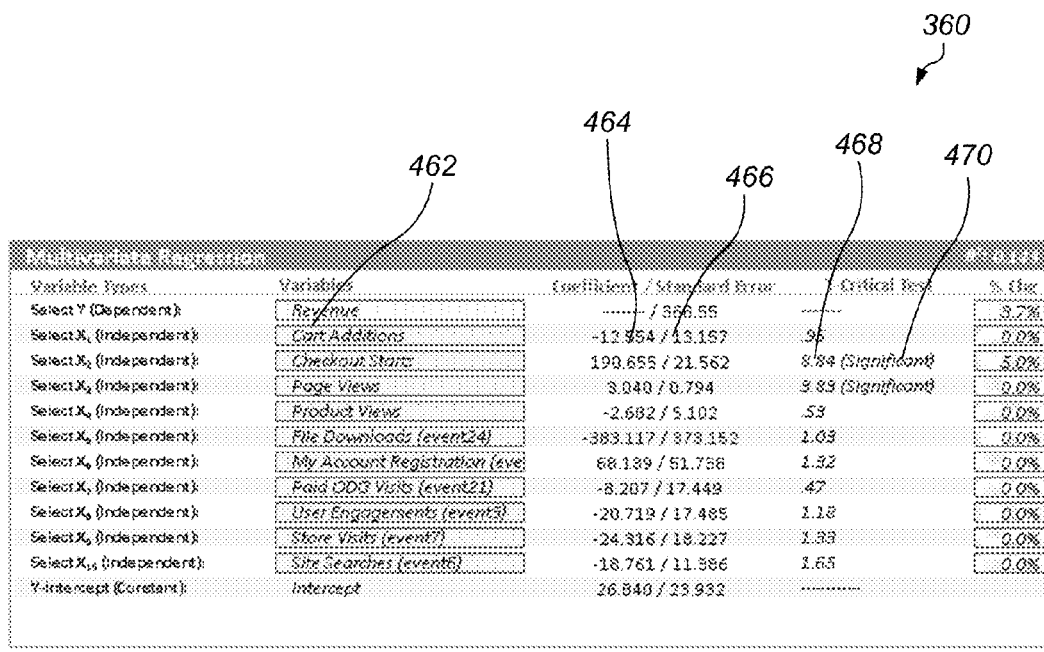
FIG. 4F illustrates a significance display window of a user interface that may be used in conjunction with predictive analysis of network analytics, according to some embodiments.

FIG. 4F illustrates a significance display window of a user interface that may be used in conjunction with predictive analysis of network analytics, according to some embodiments. A significance display window 360 is used for displaying influence of ones of the ones of the plurality of independent variables over the dependent variable using multivariate regression analysis with respect to the plurality of metric values. For each selected independent variable 462, a correlation coefficient 464 and a standard error 466 are provided. A t-critical value 468 is also provided, and most significant t-critical values are provided with labels 470.

Operations for Implementing Predictive Analytics of Network Activity

Figure 5:
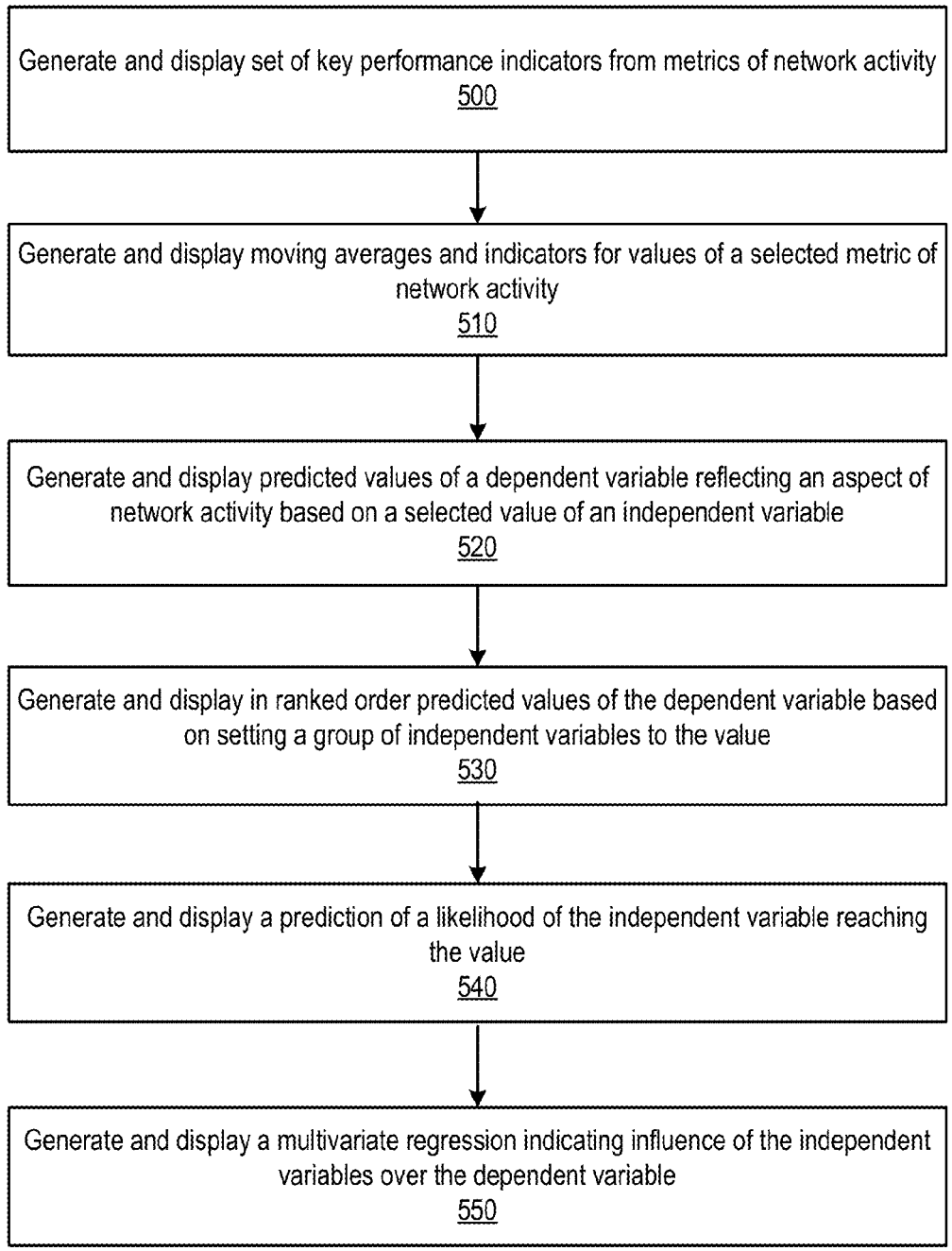
FIG. 5 depicts a high-level logical flowchart of operations performed to implement one embodiment of integrated predictive analysis of network analytics, according to some embodiments.

FIG. 5 depicts a high-level logical flowchart of operations performed to implement one embodiment of integrated predictive analysis of network analytics, according to some embodiments. A set of key performance indicators from metrics of network activity is generated and displayed (block 500). Some embodiments analyze Key Performance Indicator (KPI) behavior at a specified granularity (Daily, Weekly, Monthly) and are configurable to allow a user to choose 12 KPIs/Metrics and to compare two most recent periods, sparklines and % change. Calculations for such a set of key performance indicators include summed totals by time period. An example of such a set of key performance indicators is discussed above with respect to metrics display window 310 of FIG. 3.

A set of moving averages and indicators for values of a selected metric of network activity is generated and displayed (block 510). Such a set of moving averages may be used to identify potential KPI metric movements early and know if a fluctuation in a metric is statistically significant. Calculations for such a set of moving averages include standard deviation and rolling/exponential moving averages. Some embodiments use a weekly granularity and offer short run moving averages, long run moving averages, and Bollinger bands. An example of such a set of moving averages and indicators is discussed above with respect to moving averages display window 320 of FIG. 3.

Predicted values of a dependent variable reflecting an aspect of network activity based on a selected value of an independent variable are generated and displayed (block 520). Such predicted values may provide a visualization of opportunities by spotting the predictive strength in relationships between an independent variable in predicting a dependent variable. Some embodiments model a percentage change in the independent variable the expected average lift in the dependent variable with 95% confidence empowering an analyst with the ability to set a goal (e.g., 5% lift in product views) and see the expected KPI outcome (e.g., 3.9% lift in revenue). An example of such a set of predicted values is discussed above with respect to graphical prediction display window 330 of FIG. 3.

Predicted values of the dependent variable based on setting a group of independent variables to the value are generated and displayed in ranked order (block 530). Such a ranked display allows some embodiments to quickly rank all other available metrics as well as any other external data that the user includes (stock prices, social media data, currency exchange rates, etc.) to spot opportunities ranked by their predictive strength in predicting the dependent variable. Embodiments quickly quantify the impact of many testing opportunities before running a test as well as find areas that are important to begin testing. An example of such a ranked order display of predicted values is discussed above with respect to correlative ranking display window 340 of FIG. 3.

A prediction of a likelihood of the independent variable reaching the value is generated and displayed (block 540). Embodiments set a goal for the independent variable, and display the likelihood of hitting that goal based upon historic metric fluctuations, thereby displaying whether the opportunity and goal are realistic or not. An example of such a ranked order display of predicted values is discussed above with respect to prediction probability display window 350 of FIG. 3.

A multivariate regression indicating influence of the independent variables over the dependent variable is generated and displayed (block 550). Some embodiments include visitor-ID level data and display how 10 different independent variables predict one dependent variable. Some embodiments model a percentage change in an independent variable while accounting for all the other independent variables influence in driving the main KPI. Some embodiments provide a sense of how metrics influence visitors over time in driving downstream conversion (identify sales cycle variables of influence) An example of such a ranked order display of predicted values is discussed above with respect to significance display window 360 of FIG. 3.

Figure 6:
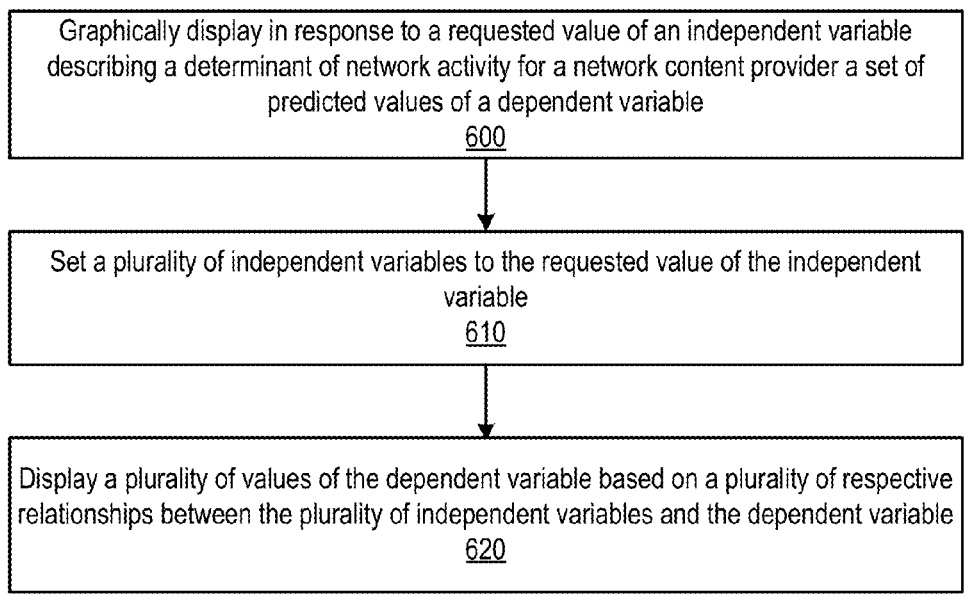
FIG. 6 illustrates a high-level logical flowchart of operations performed to implement one embodiment of regression-based predictive analysis of network analytics, according to some embodiments.

FIG. 6 illustrates a high-level logical flowchart of operations performed to implement one embodiment of regression-based predictive analysis of network analytics, according to some embodiments. In response to a requested value of an independent variable describing a determinant of network activity for a network content provider a set of predicted values of a dependent variable is displayed (block 600). A plurality of independent variables is set to the requested value of the independent variable (block 610). A plurality of values of the dependent variable based on a plurality of respective relationships between the plurality of independent variables and the dependent variable is displayed (block 620).

Figure 7:
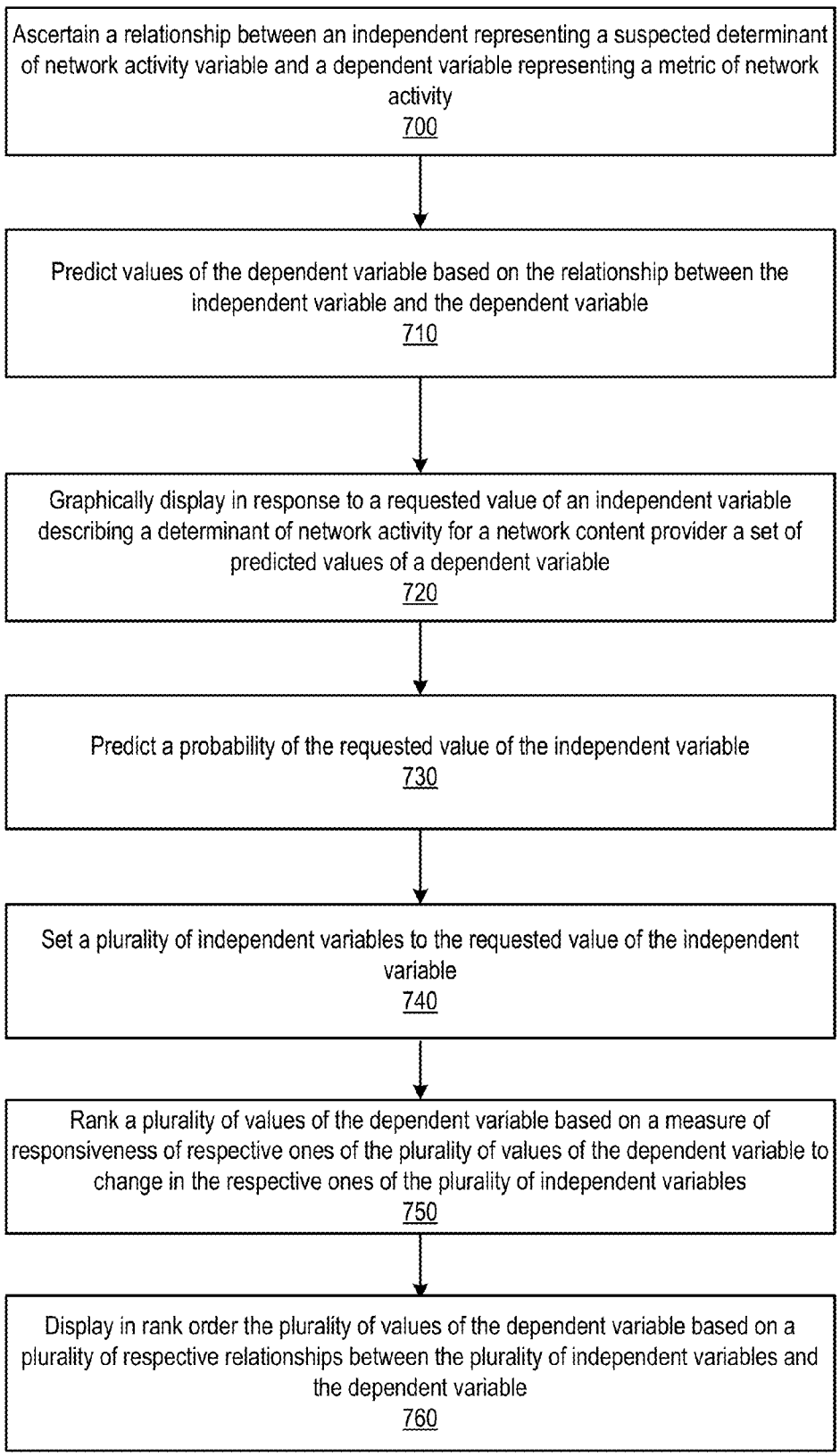
FIG. 7 depicts a high-level logical flowchart of operations performed to implement another embodiment of regression-based predictive analysis of network analytics, according to some embodiments.

FIG. 7 depicts a high-level logical flowchart of operations performed to implement another embodiment of regression-based predictive analysis of network analytics, according to some embodiments. A relationship between an independent representing a suspected determinant of network activity variable and a dependent variable representing a metric of network activity is ascertained (block 700). Values of the dependent variable are predicted based on the relationship between the independent variable and the dependent variable (block 710). In response to a requested value of an independent variable describing a determinant of network activity for a network content provider a set of predicted values of a dependent variable are graphically displayed (block 720). A probability of the requested value of the independent variable is predicted (block 730). A plurality of independent variables is set to the requested value of the independent variable (block 740). A plurality of values of the dependent variable is ranked based on a measure of responsiveness of respective ones of the plurality of values of the dependent variable to change in the respective ones of the plurality of independent variables (block 750). The plurality of values of the dependent variable is displayed in rank order based on a plurality of respective relationships between the plurality of independent variables and the dependent variable (block 760).

Figure 8:
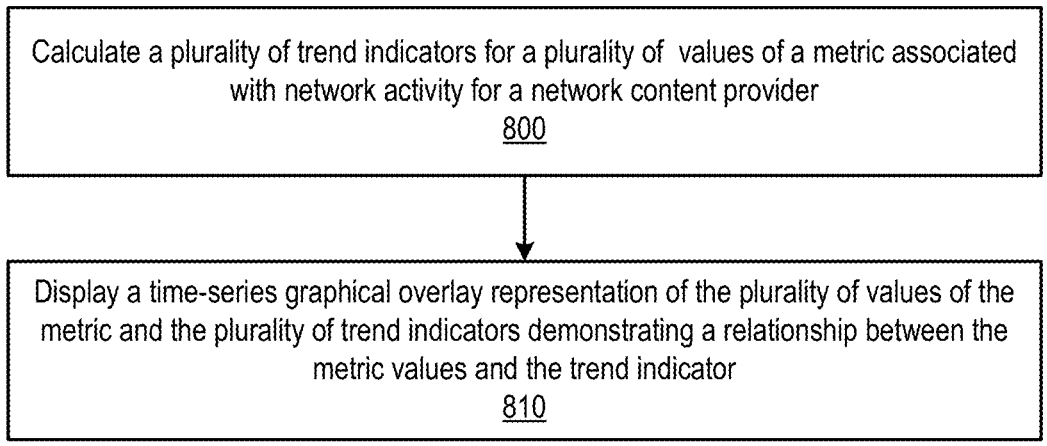
FIG. 8 illustrates a high-level logical flowchart of operations performed to implement one embodiment of trend-based predictive analysis of network analytics, according to some embodiments.

FIG. 8 illustrates a high-level logical flowchart of operations performed to implement one embodiment of trend-based predictive analysis of network analytics, according to some embodiments. A plurality of trend indicators for a plurality of values of a metric associated with network activity for a network content provider is calculated (block 800). A time-series graphical overlay representation of the plurality of values of the metric and the plurality of trend indicators demonstrating a relationship between the metric values and the trend indicator is displayed (block 810).

Figure 9:
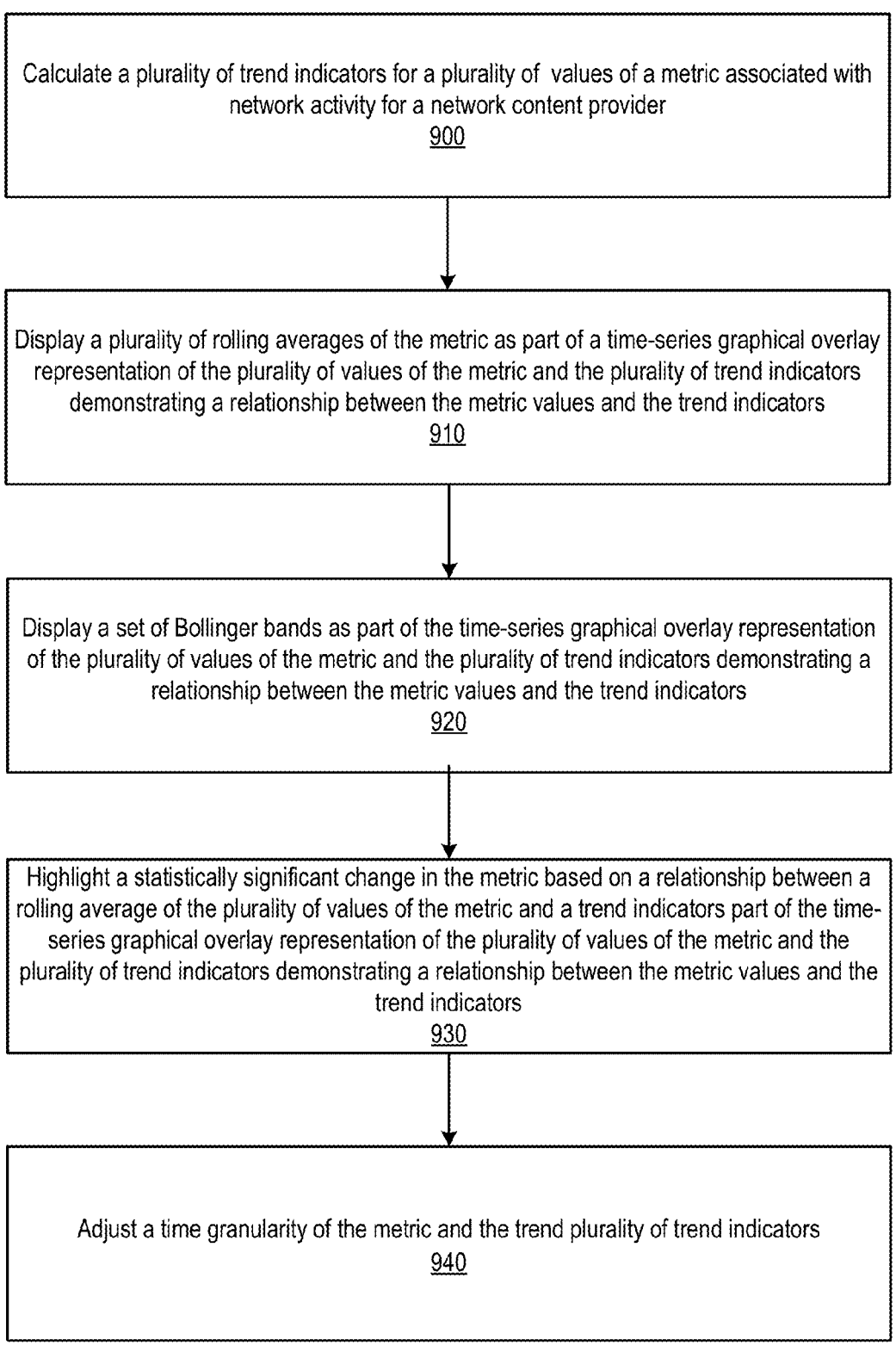
FIG. 9 depicts a high-level logical flowchart of operations performed to implement another embodiment of trend-based predictive analysis of network analytics, according to some embodiments.
Figure 10:
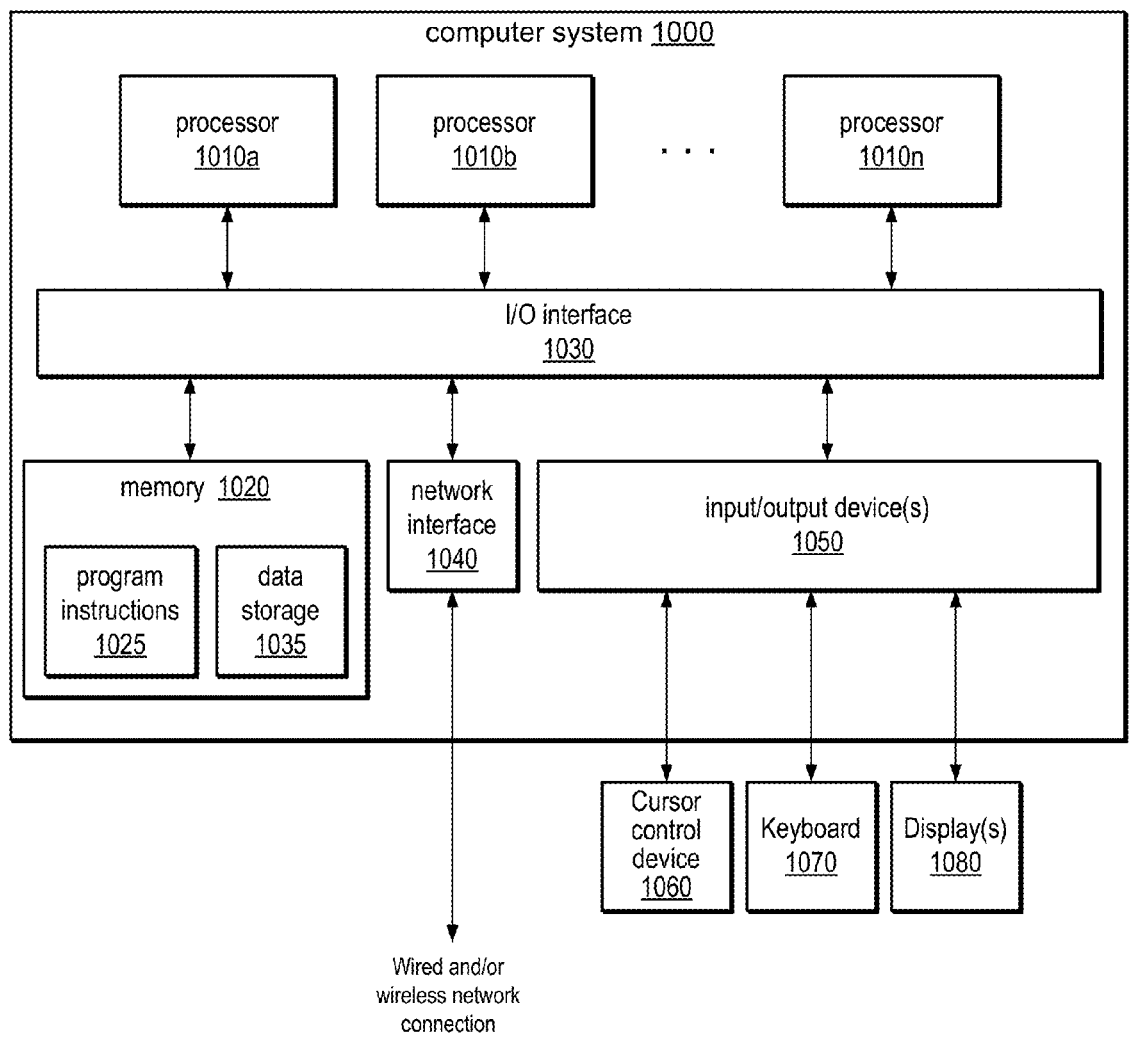
FIG. 10 depicts an example computer system that may be used in embodiments.

FIG. 9 depicts a high-level logical flowchart of operations performed to implement another embodiment of trend-based predictive analysis of network analytics, according to some embodiments. A plurality of trend indicators for a plurality of values of a metric associated with network activity for a network content provider is calculated (block 900). A plurality of rolling averages of the metric as part of a time-series graphical overlay representation of the plurality of values of the metric and the plurality of trend indicators demonstrating a relationship between the metric values and the trend indicators is displayed (block 910). A set of Bollinger bands is displayed as part of the time-series graphical overlay representation of the plurality of values of the metric and the plurality of trend indicators demonstrating a relationship between the metric values and the trend indicators (block 920). A statistically significant change in the metric is highlighted based on a relationship between a rolling average of the plurality of values of the metric and a trend indicators part of the time-series graphical overlay representation of the plurality of values of the metric and the plurality of trend indicators demonstrating a relationship between the metric values and the trend indicators (block 930). A time granularity of the metric and the trend plurality of trend indicators is adjusted (block 940).

Example System

Embodiments of a network activity analytics analysis module and/or of the various network activity metric trend display and network activity metric value prediction techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a network activity analytics analysis module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a network activity analytics analysis module as described herein, and data storage 1035, comprising various data accessible by program instructions 1025. In one embodiment, program instructions 1025 may include software elements of embodiments of a network activity analytics analysis module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a network activity analytics analysis module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method for ascertaining trends in network activity data, the method comprising:
   generating, by processing hardware, a graphical interface based on network activity for a network content provider, wherein generating the graphical interface comprises:
      calculating a plurality of trend indicators for a plurality of values of a metric associated with the network activity for the network content provider, wherein the trend indicators comprise:
         one or more moving averages of the plurality of values of the metric, the one or more moving averages comprising a short-run moving average, an exponential moving average, and a long-run moving average,
         one or more standard deviation values of the plurality of values of the metric;
      generating a time-series graphical overlay representation comprising a plurality of time values in relation to the plurality of values of the metric associated with the plurality of time values, a plurality of values for the one or more moving averages associated with the plurality of time values, and a plurality of the one or more standard deviation values associated with the plurality of time values, wherein the time-series graphical overlay representation is generated by overlaying the plurality of values of the metric, the plurality of values for the one or more moving averages, and the plurality of values for the one or more standard deviation values, and
      displaying the time-series graphical overlay representation; and
   updating, by the processing hardware, the graphical interface by performing operations comprising:
      identifying a statistically significant change based on at least one of (i) a divergence from the one or more standard deviation values by at least some of the plurality of values of the metric and (ii) an intersection between at least two of the short-run moving average, the exponential moving average, and the long-run moving average, and
      modifying the graphical interface to highlight a portion of the displayed time-series graphical overlay representation that corresponds to the statistically significant change.

2. The computer-implemented method of claim 1, wherein calculating the plurality of trend indicators further comprises calculating a set of Bollinger bands and wherein the time-series graphical overlay representation is generated by overlaying the plurality of values of the metric, the plurality of values for the one or more moving averages, and the set of Bollinger bands.

3. The computer-implemented method of claim 1, wherein the displaying the time-series graphical overlay representation of the plurality of values of the metric and the plurality of trend indicators further comprises displaying a plurality of rolling averages of the metric.

4. The computer-implemented method of claim 1, wherein the displaying the time-series graphical overlay representation of the plurality of values of the metric and the plurality of trend indicators further comprises adjusting a time granularity of the metric and the trend plurality of trend indicators.

5. The computer-implemented method of claim 1, wherein the method further comprises receiving the plurality of metric values associated with the network activity for the network content provider.

6. The method of claim 1, wherein overlaying the plurality of values of the metric, the plurality of values for the one or more moving averages, and the plurality of values for the one or more standard deviation values comprises visually depicting a zone of values delineated by the plurality of the one or more standard deviation values in the time-series graphical overlay representation;
wherein identifying the statistically significant change in the plurality of values of the metric displayed in the time-series graphical overlay representation comprises determining that one or more of the plurality of values of the metric is outside the zone of values;
wherein highlighting the statistically significant change in the time-series graphical overlay representation comprises highlighting the portion of the time-series graphical overlay representation in which the one or more of the plurality of values of the metric are displayed.

7. The method of claim 1, wherein generating the plurality of values for the one or more moving averages associated with the plurality of time values comprises generating a first plurality of values for the short-run moving average averaged over a first time period and a second plurality of values for the long-run moving average averaged over a second time period that is greater than the first time period;
wherein identifying the statistically significant change in the plurality of values of the metric displayed in the time-series graphical overlay representation comprises determining that the first plurality of values for the short-run moving average intersects the second plurality of values for the long-run moving average;
wherein highlighting the statistically significant change in the time-series graphical overlay representation comprises highlighting the portion of the time-series graphical overlay representation that displays the first plurality of values for the short-run moving average and the second plurality of values for the long-run moving average that intersect.

8. A non-transitory computer-readable storage medium storing program instructions, wherein the program instructions are executable by processing hardware to implement a method comprising:
generating a graphical interface based on network activity for a network content provider, wherein generating the graphical interface comprises:
calculating a plurality of trend indicators for a plurality of values of a metric associated with the network activity for the network content provider, wherein the trend indicators comprise:
one or more moving averages of the plurality of values of the metric, the one or more moving averages comprising a short-run moving average, an exponential moving average, and a long-run moving average, and
one or more standard deviation values of the plurality of values of the metric,
generating a time-series graphical overlay representation comprising a plurality of time values in relation to the plurality of values of the metric associated with the plurality of time values, a plurality of values for the one or more moving averages associated with the plurality of time values, and a plurality of the one or more standard deviation values associated with the plurality of time values, wherein the time-series graphical overlay representation is generated by overlaying the plurality of values of the metric, the plurality of values for the one or more moving averages, and the plurality of values for the one or more standard deviation values, and
displaying the time-series graphical overlay representation; and
updating the graphical interface by performing operations comprising:
identifying a statistically significant change based on at least one of (i) a divergence from the one or more standard deviation values by at least some of the plurality of values of the metric and (ii) an intersection between at least two of the short-run moving average, the exponential moving average, and the long-run moving average; and
modifying the graphical interface to highlight a portion of the displayed time-series graphical overlay representation that corresponds to the statistically significant change.

9. The non-transitory computer-readable storage medium of claim 8, wherein the program instructions for calculating the plurality of trend indicators are further configured to implement calculating Bollinger bands and wherein the program instructions for generating the time-series graphical overlay representation are further configured for overlaying the plurality of values of the metric, the plurality of values for the one or more moving averages, and the set of Bollinger bands.

10. The non-transitory computer-readable storage medium of claim 8, wherein the program instructions computer-executable for displaying the time-series graphical overlay representation of the plurality of values of the metric and the plurality of trend indicators are further configured for displaying a plurality of rolling averages of the metric.

11. A system, comprising:
processing hardware; and
a memory comprising program instructions, wherein the program instructions are executable by the processing hardware to:
generate a graphical interface based on network activity for a network content provider, wherein the processing hardware is configured to generate the graphical interface by performing operations comprising:
calculating a plurality of trend indicators for a plurality of values of a metric associated with the network activity for the network content provider, wherein the trend indicators comprise:

one or more moving averages of the plurality of values of the metric, the one or more moving averages comprising a short-run moving average, an exponential moving average, and a long-run moving average, and one or more standard deviation values of the plurality of values of the metric, generating a time-series graphical overlay representation comprising a plurality of time values in relation to the plurality of values of the metric associated with the plurality of time values, a plurality of values for the one or more moving averages associated with the plurality of time values, and a plurality of the one or more standard deviation values associated with the plurality of time values, wherein the time-series graphical overlay representation is generated by overlaying the plurality of values of the metric, the plurality of values for the one or more moving averages, and the plurality of values for the one or more standard deviation values, and displaying the time-series graphical overlay representation, and update the graphical interface, wherein the processing hardware is configured to update the graphical interface by performing operations comprising:

identifying a statistically significant change based on at least one of (i) a divergence from the one or more standard deviation values by at least some of the plurality of values of the metric and (ii) an intersection between at least two of the short-run moving average, the exponential moving average, and the long-run moving average; and modifying the graphical interface to highlight a portion of the displayed time-series graphical overlay representation that corresponds to the statistically significant change.

12. The system of claim 11, wherein the program instructions executable by the processing hardware to calculate the plurality of trend indicators further comprise program instructions executable by the processing hardware to calculate Bollinger bands and wherein the program instructions executable by the processing hardware to generate the time-series graphical overlay representation further comprise program instructions executable by the processing hardware to overlay the plurality of values of the metric, the plurality of values for the one or more moving averages, and the set of Bollinger bands.

13. The system of claim 11, wherein the program instructions executable by the processing hardware to display the time-series graphical overlay representation further comprise program instructions executable by the processing hardware to display a plurality of rolling averages of the metric in the time-series graphical overlay representation, wherein the time-series graphical overlay representation is generated by overlaying the plurality of values of the metric, the plurality of values for the one or more moving averages, and the set of Bollinger bands.

14. The system of claim 11, wherein the program instructions executable by the processing hardware to display the time-series graphical overlay representation of the plurality of values of the metric and the plurality of trend indicators further comprise program instructions executable by the processing hardware to:

identify a statistically significant change in the plurality of values of the metric displayed in the time-series graphical overlay representation; and highlight a portion of the time-series graphical overlay representation corresponding to the statistically significant change in the metric.

* * * * *